United States Patent [19]
Dick

[11] Patent Number: 5,417,172
[45] Date of Patent: May 23, 1995

[54] SEEDER

[76] Inventor: Adrian K. Dick, RMB 7258, Echuca, Victoria 3564, Australia

[21] Appl. No.: 211,379

[22] PCT Filed: Oct. 1, 1992

[86] PCT No.: PCT/AU92/00525
§ 371 Date: May 13, 1994
§ 102(e) Date: May 13, 1994

[87] PCT Pub. No.: WO93/06706
PCT Pub. Date: Apr. 15, 1993

[30] Foreign Application Priority Data
Oct. 1, 1991 [AU] Australia .................. PK8664

[51] Int. Cl.6 .................................. A01C 5/00
[52] U.S. Cl. ..................... 111/157; 111/52; 172/156; 172/166; 172/572
[58] Field of Search ............ 111/121, 123, 134, 135, 111/136, 140, 157, 164, 186, 195, 924, 926; 172/156, 166, 196, 464, 572, 624.5

[56] References Cited

U.S. PATENT DOCUMENTS

| | | | |
|---|---|---|---|
| 1,858,749 | 5/1932 | Paterson et al. | 172/166 |
| 2,146,492 | 2/1939 | Wiesenthal | 172/572 |
| 2,202,091 | 5/1940 | Collins | 172/156 |
| 2,644,387 | 7/1953 | Kamplade | 172/156 |
| 3,093,196 | 6/1963 | Nakatani | 111/164 X |
| 3,394,669 | 7/1968 | Pas et al. | 111/135 X |
| 4,043,281 | 8/1977 | Sorlie et al. | 111/134 X |
| 4,289,081 | 9/1981 | Koronka | 111/164 |
| 4,726,303 | 2/1988 | Deyelman et al. | 111/52 |

*Primary Examiner*—Dennis L. Taylor
*Assistant Examiner*—Robert Pezzito
*Attorney, Agent, or Firm*—Ryan, Kees & Hohenfeldt

[57] ABSTRACT

A seeder comprises a coulter assembly (13) operable to cut stubble/grass in a series of parallel lines in the first stage of forming a plurality of parallel rows of seed beds. The coulter assembly (13) comprises a plurality of coulters (21) and is operable to rotate the coulters (21) in a series of parallel circular paths around a central axis at a rate that is sufficient, relative to the forward direction of the seeder, so that the coulters (21) in each circular path make multiple cuts to the same section of ground surface in each parallel line.

8 Claims, 4 Drawing Sheets

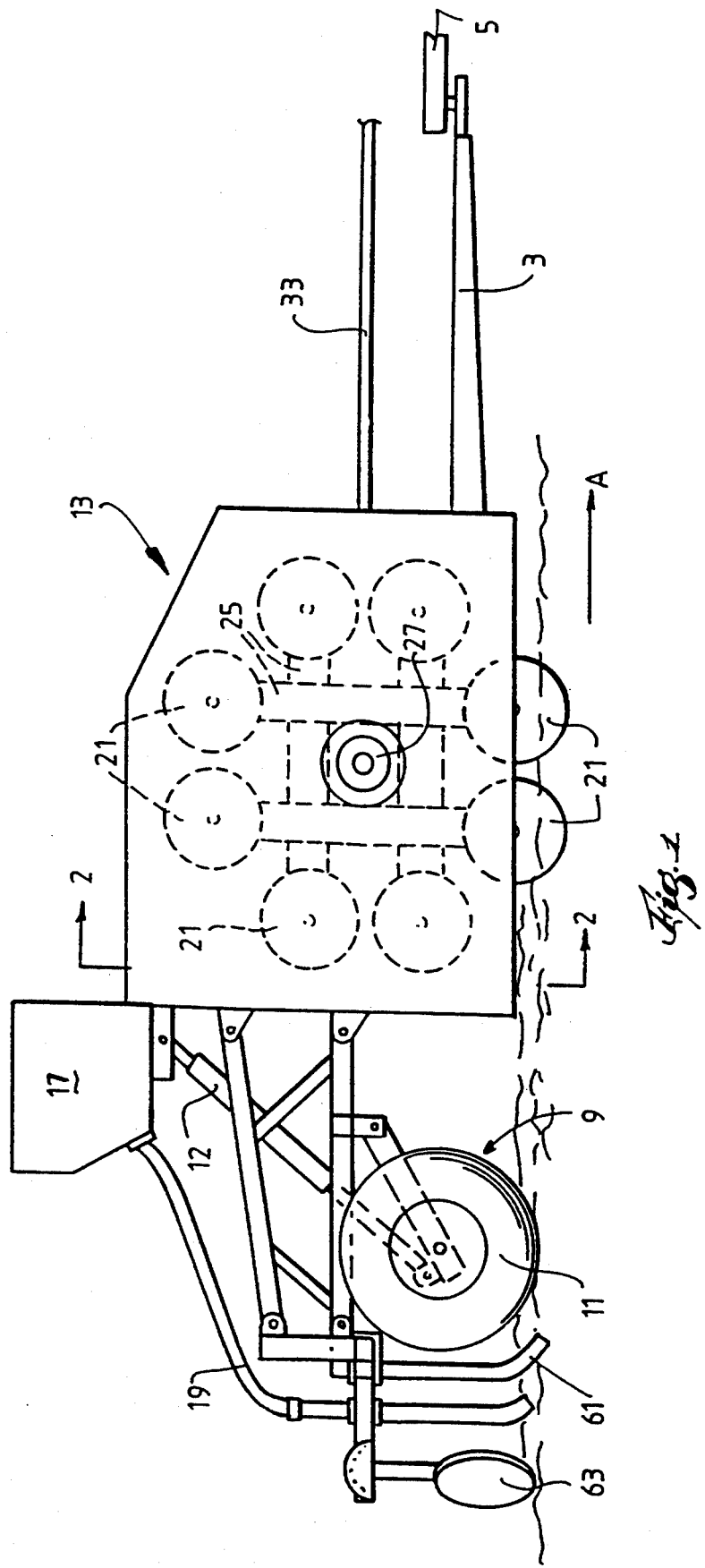

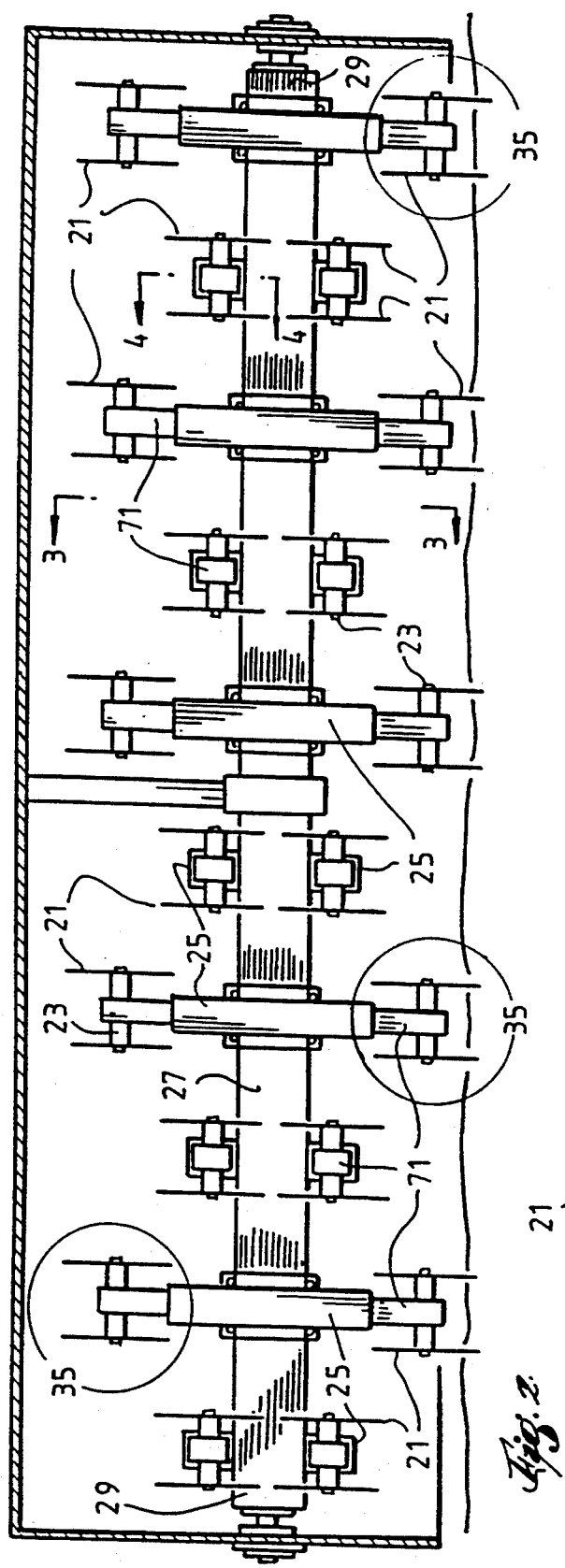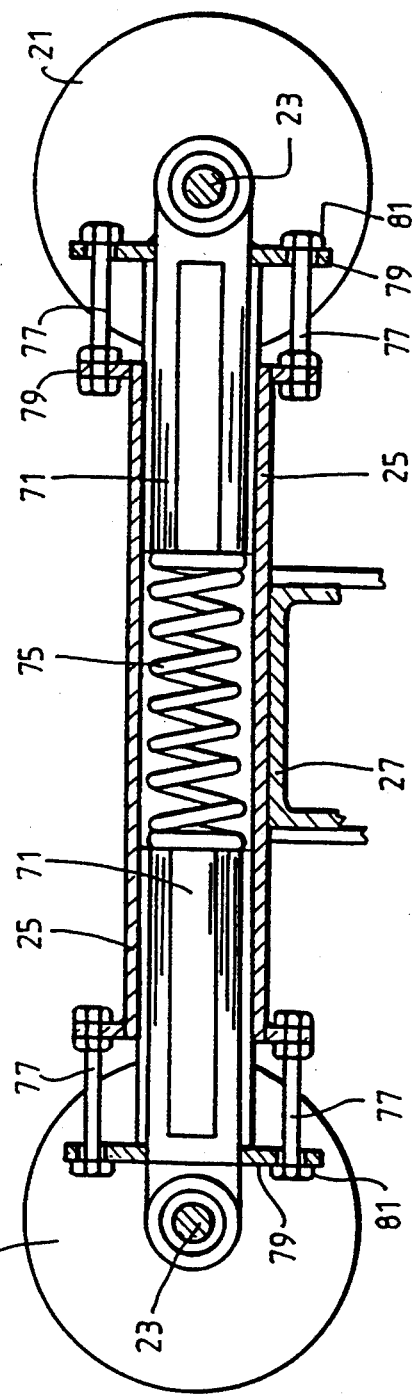

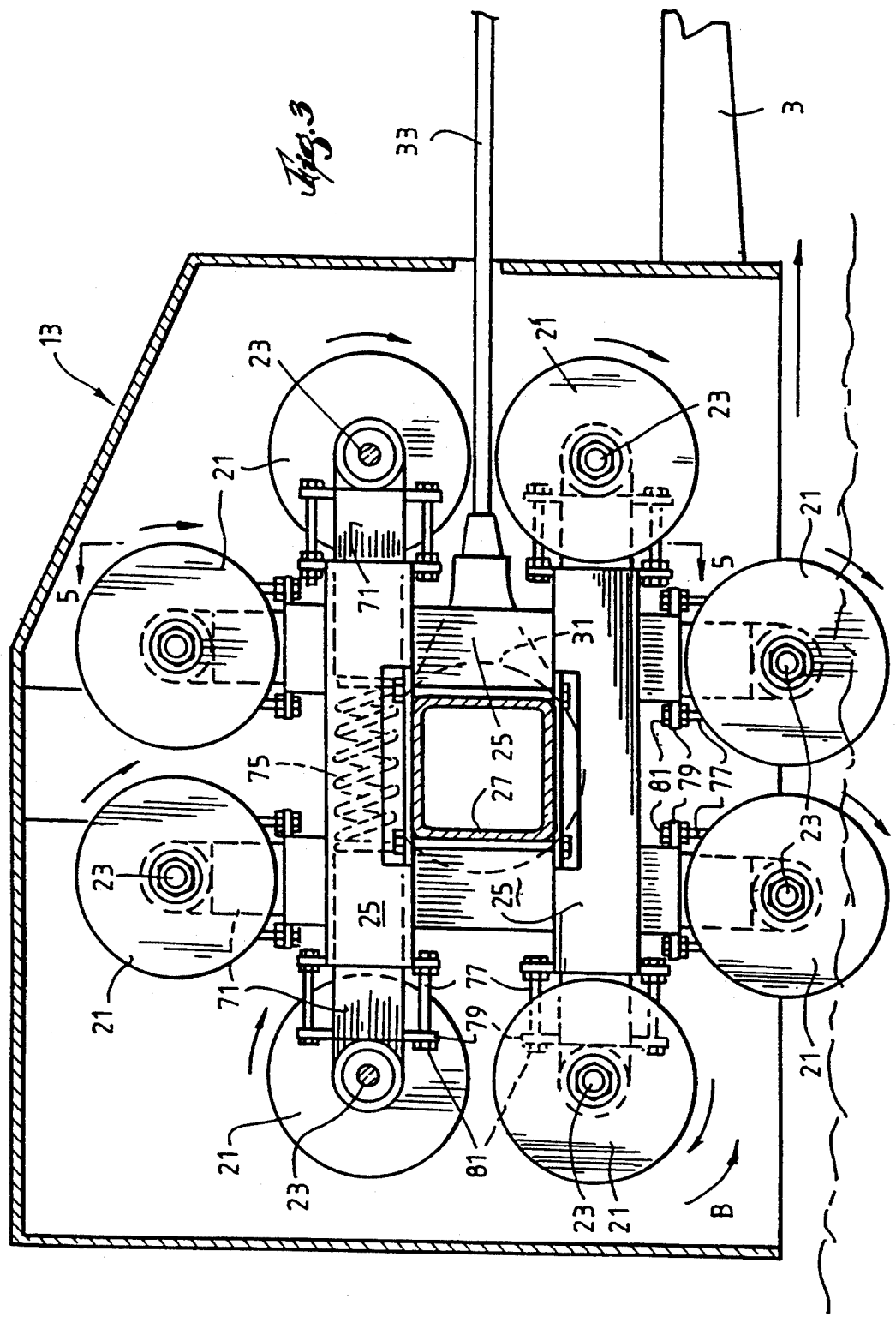

SEEDER

The present invention relates to a seeder for forming a plurality of parallel rows of seed beds and then depositing seeds into the seed beds.

In order to form seed beds, the conventional conservation tillage seeders comprise a set of coulters to penetrate the ground surface and cut the stubble/straw and a set of tynes which follow the lines of the coulters to break and lift the soil and thereby complete forming the seed beds.

A disadvantage of the conventional conservation tillage seeders is that in many situations, particularly in soft sand conditions, the coulters only force the stubble to the sides and do not cut the stubble with the result that the following tynes are quickly blocked and consequently it is difficult to form the seed beds.

An object of the present invention is to provide a seeder which alleviates the disadvantages of conventional conservation tillage seeders described in the preceding paragraph.

According to the present invention there is provided a seeder for forming a plurality of parallel rows of seed beds in a ground surface, the seeder comprising, a plurality of coulters, each coulter having a central axis about which the coulter is freely-rotatable, and an assembly for supporting the coulters in sets of at least two coulters and for rotating the coulters so that the coulters in each set move in the same circular path about an axis tranverse to a forward direction of movement of the seeder at a rate sufficient for at least two of the coulters in each set to penetrate the same section of the ground surface and to move forwardly through the section to make multiple cuts to the stubble/grass in the section.

It is preferred that each set of coulters comprises two coulters spaced 180 degrees apart on the circular path.

It is preferred particularly that each set of coulters comprises four coulters arranged in pairs with the coulters in each pair being closely spaced and one coulter of a first pair being spaced 180° from one coulter in a second pair and the other coulter of the first pair being spaced 180° from the other coulter of the second pair.

It is preferred that the coulter support assembly comprises a drive shaft rotatable about the transverse axis and a plurality of arms mounted to the drive shaft at spaced intervals along the length of the drive shaft, with the coulters in each set of coulters being mounted to the arms.

It is preferred that the coulters be resiliently mounted to the arms to minimise damage to the coulters in the event that the coulters contact a hard object.

It is preferred that the seeder further comprises a plurality of tynes positioned to follow the coulters to break and lift the soil in the sections of the ground surface penetrated by the coulters to thereby form the seed beds.

It is preferred that the seeder further comprises a plurality of seeder tubes positioned to follow the tynes to deposit seeds in the seed beds.

It is preferred that the seeder further comprises a plurality of coulters positioned to follow the seeder tubes to reposition soil lifted from the ground surface to form the seed beds in the first instance back into the seed beds to cover the seeds.

The present invention is described further with reference to the accompanying drawings, in which:

FIG. 1 is a side view of a preferred embodiment of a seeder formed in accordance with the present invention, FIG. 2 is a section along the line 2—2 in FIG. 1;

FIG. 3 is a section along the line 3—3 in FIG. 2;

FIG. 4 is a section along the line 4—4 in FIG. 2; and

Figure 5:
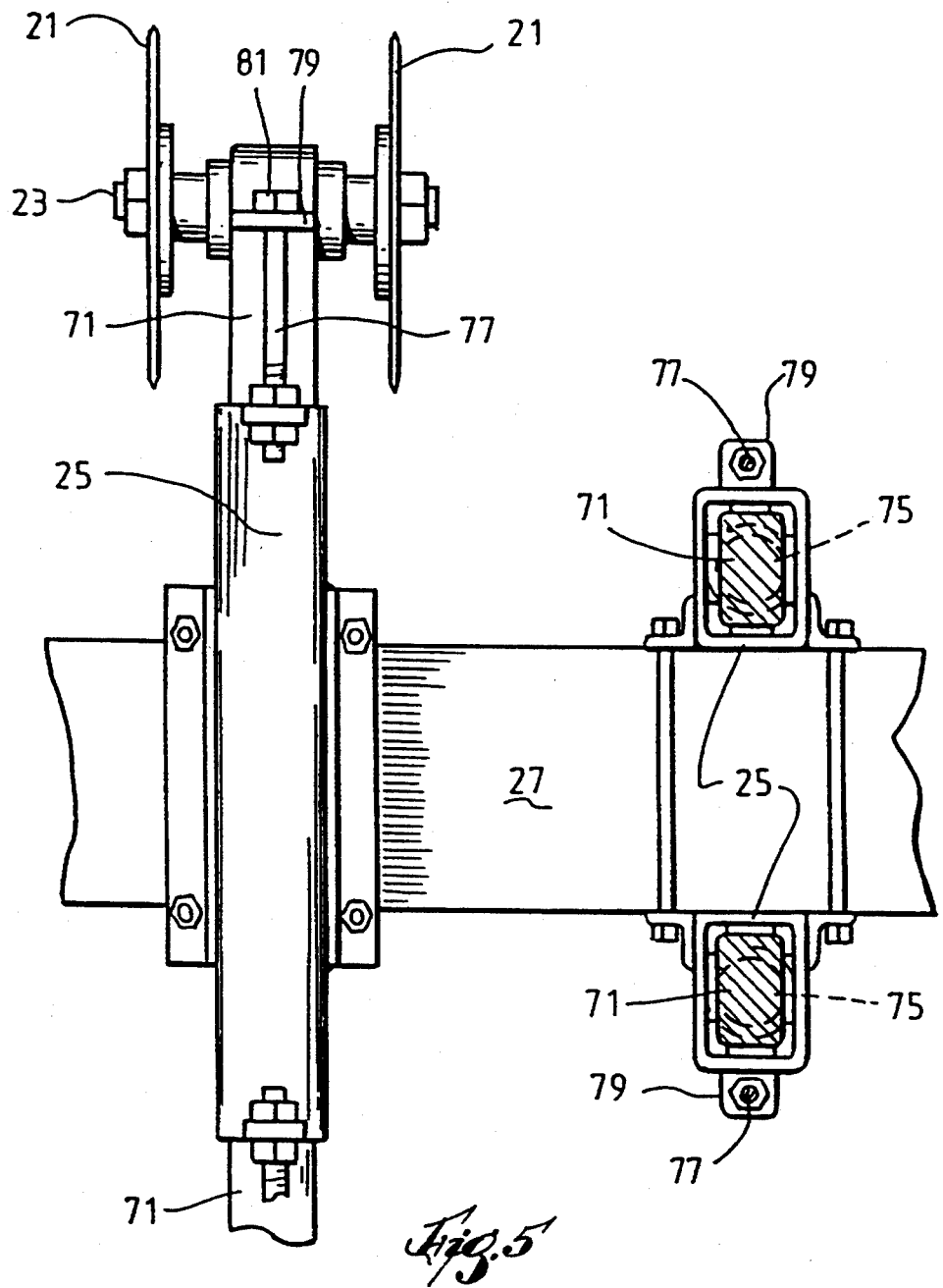
FIG. 5 is a section along the line 5—5 in FIG. 3.

With particular reference to FIG. 1, the preferred embodiment of the seeder in accordance with the present invention comprises a frame formed from side bearers (not shown), transverse bearers (not shown), and triangular forward bearers 3 supporting a central draw bar 5 that is arranged in use to be connected to the towing hitch of a suitable towing vehicle such as a tractor.

The frame is supported towards its rear end by an axle assembly 9 that supports a pair of tire and wheel assemblies 11 to support the seeder and allow the seeder to be drawn across the ground by the towing vehicle in a forward direction indicated by the arrow marked A in FIG. 1. Although not shown in detail, the axle assembly 9 is pivotally attached to the frame and suitable hydraulic or pneumatic rams 12 are provided between the axle assembly 9 and the frame to cause a change in their angular relationship to, in effect, alter the height at which the seeder extends above the ground surface.

With further particular reference to FIG. 1, the seeder also comprises:

(a) a coulter assembly 13 operable to penetrate and cut the stubble/grass in a first stage in forming a plurality of parallel rows of seed beds;

(b) a plurality of tynes 61 positioned to follow the coulter assembly 13 to break the bottom soil and top clay to effect deep root penetration with minimum disturbance and to lift the soil/clay to complete forming the seed beds;

(c) a seeder assembly 15 comprising a seed bin 17 and an array of seed delivery chutes 19 to deposit seeds into the seed beds; and (d) a plurality of coulters 63 positioned to follow the seeder assembly 15 on one side of or transverse to the seed beds to displace soil that was removed from the seed beds back into the seed beds to cover the seeds.

It is particularly preferred that the coulters 63 be adjustable both in terms of height above the ground surface and angle to the direction of movement of the seeder.

With reference to FIG. 3, the coulter assembly 13 comprises a plurality of coulters 21 supported by spindles 23 to rotate freely about their central axes. The spindles 23 are mounted to the ends of arms 25 which are bolted to a drive shaft 27 which in turn is supported at opposite ends 29 by the frame for rotation about an axis transverse to the direction of forward movement of the seeder. The drive shaft 27 is coupled by a gear assembly 31 to a drive shaft 33, and the drive shaft 33 is coupled to the P.T.O. of the vehicle.

The coulter assembly 13 is operable to rotate the coulters 21 in a series of parallel circular paths in the direction of the arrow B in FIG. 3 around the transverse axis of the drive shaft 27. The coulter assembly 13 is arranged so that there are four coulters 21 that describe each circular path. In accordance with the present invention the coulter assembly 13 is operable to rotate the coulters 21 at a rate that is sufficient relative to the forward direction of the seeder so that at least two coulters 21 rotating in each circular path 21 periodically contact the same section of the ground surface and thus apply multiple cuts to the stubble/grass in that section of the ground surface as the seeder moves forward.

With reference to FIGS. 2 and 5, the coulters 21 are mounted in pairs, indicated by circles 35 in the figures, at the ends of each arm 25. The coulters 21 of each pair are mounted to a common spindle 23 and the spindle 23 is journalled in bearings (not shown) supported by a shaft 71 that extends into the hollow core of the arm 25. The spacing between the coulters 21 of each arm is adjustable.

The coulters 21 are coupled to the arms 25 so as to minimise damage to the coulters 21 if the coulters 21 contact a hard object such as a rock. In this regard, the shafts 71 are formed for sliding movement in the arms 25. In addition, as can best be seen in FIG. 4, each arm 25 houses a spring 75 which biases the shafts 71 outwardly. A pair of threaded guide pins 77 are connected to the arms 25 at each end thereof and are arranged to extend through openings in flanges 79 provided on the shafts 71. The arrangement also comprises nuts 81 on the guide pins 77 which provide reaction surfaces to limit the outward movement of the shafts 71 in response to the biasing action of the spring 75.

The seeder shown in the drawings and described above is capable of forming a number of parallel rows of seed beds and depositing seeds in the seed beds and in view of the multiple cutting action of the coulter assembly 13 the seeder is not subject to the "hair-pinning" effect of the conventional conservation tillage seeders. Thus, the seeder shown in the drawings and described above is suitable for use in a wide range of soil conditions, including soft soil.

A typical seeder in accordance with the drawings has the following specifications.

(a) Spacing between coulters 21 at opposite ends of each arm 25 (measured between the spindles 23); 1.1 m.
(b) Diameter of coulters 21; 40 cm.
(c) Spacing between the coulters 21 in the pairs of coulters 21 at each end of the arms 21; 18-25 cm.
(d) Spacing between adjacent sets of coulters 21 along the length of the shaft 27; 18-25 cm.
(e) Rate of rotation of shaft 27; 200-400 rpm.

In order to operate a seeder having the above specifications properly the forward speed of the seeder should be 3-4 km/hr over heavy soil and 7-10 km/hr over sandy soil.

Many modifications may be made to the preferred embodiment without departing from the spirit and scope of the present invention.

In this regard, whilst the preferred embodiment comprises a particular arrangement of coulters 21, it can readily be appreciated that the present invention covers any suitable arrangement of coulters 21.

Furthermore, whilst the preferred embodiment comprises a particular arrangement of tynes 61, seeder assembly 15, and coulters 63 following the coulter assembly 13, it can readily be appreciated that the present invention covers any suitable arrangement to form the seed beds, deliver seeds to the seed beds, and cover the seeds.

I claim:

1. A seeder for forming a plurality of parallel rows of seed beds in a ground surface, the seeder comprising, a plurality of coulters, each coulter having a central axis about which the coulter is freely-rotatable, and an assembly for supporting the coulters in sets of at least two coulters and for rotating the coulters so that the coulters in each set move in the same circular path about an axis transverse to a forward direction of movement of the seeder at a rate sufficient for at least two of the coulters in each set to penetrate the same section of the ground surface and to move forwardly through the section to make multiple cuts to the stubble/grass in the section.

2. The seeder defined in claim 1, wherein each set of coulters comprises two coulters spaced 180 degrees apart on the circular path.

3. The seeder defined in claim 1, wherein each set of coulters comprises four coulters arranged in pairs with the coulters in each pair being closely spaced and one coulter of a first pair being spaced 180° from one coulter in a second pair and the other coulter of the first pair being spaced 180° from the other coulter of the second pair.

4. The seeder defined in any one of the preceding claims, wherein the coulter support assembly comprises a drive shaft rotatable about the transverse axis and a plurality of arms mounted to the drive shaft at spaced intervals along the length of the drive shaft, with the coulters in each set of coulters being mounted to the arms.

5. The seeder defined in claim 4, wherein the coulters are resiliently mounted to the arms to minimise damage to the coulters in the event that the coulters contact a hard object.

6. The seeder defined in claim 5, further comprises a plurality of tynes positioned to follow the coulters to break and lift the soil in the sections of the ground surface penetrated by the coulters to thereby form the seed beds.

7. The seeder defined in claim 6, further comprises a plurality of seeder tubes positioned to follow the tynes to deposit seeds in the seed beds.

8. The seeder defined in claim 7, further comprises a plurality of coulters positioned to follow the seeder tubes to reposition soil lifted from the ground surface to form the seed beds in the first instance back into the seed beds to cover the seeds.

* * * * *